US008475305B2

(12) United States Patent
Ichida

(10) Patent No.: US 8,475,305 B2
(45) Date of Patent: Jul. 2, 2013

(54) METHOD AND APPARATUS FOR SHIFTING A BICYCLE TRANSMISSION

(75) Inventor: Tadashi Ichida, Sakai (JP)

(73) Assignee: Shimano, Inc., Sakai (JP)

( * ) Notice: Subject to any disclaimer, the term of this patent is extended or adjusted under 35 U.S.C. 154(b) by 0 days.

(21) Appl. No.: 13/483,727

(22) Filed: May 30, 2012

(65) Prior Publication Data

US 2012/0245809 A1 Sep. 27, 2012

Related U.S. Application Data

(62) Division of application No. 11/970,753, filed on Jan. 8, 2008, which is a division of application No. 11/754,343, filed on May 28, 2007, now abandoned, which is a division of application No. 10/001,324, filed on Nov. 23, 2001, now abandoned.

(51) Int. Cl.
*F16H 9/00* (2006.01)
*F16H 61/02* (2006.01)
*G06F 17/00* (2006.01)

(52) U.S. Cl.
USPC .............................................. 474/70; 701/51

(58) Field of Classification Search
USPC ................................... 474/69, 70, 71; 701/51
See application file for complete search history.

(56) References Cited

U.S. PATENT DOCUMENTS

| 4,412,828 | A | 11/1983 | Darby |
| 5,213,548 | A | 5/1993 | Colbert et al. |
| 5,261,858 | A | 11/1993 | Browning |
| 5,266,065 | A | 11/1993 | Ancarani Restelli |
| 5,357,177 | A | 10/1994 | Fey et al. |
| 5,470,277 | A | 11/1995 | Romano |
| 5,577,969 | A | 11/1996 | Watarai |
| 5,599,244 | A | 2/1997 | Ethington |
| 5,644,511 | A | 7/1997 | McWhorter |
| 5,681,234 | A | 10/1997 | Ethington |
| 5,728,017 | A | 3/1998 | Bellio et al. |

(Continued)

FOREIGN PATENT DOCUMENTS

DE 19609723 A1 9/1997
EP 0529664 A2 3/1993

OTHER PUBLICATIONS

IEEE 100; The Authoritative Dictionary Of IEEE Standards Terms, Seventh Edition; published Dec. 2000 by Standards Information Network; pp. 12 and 13; definitions of "active-high signal" and "active-low signal."

*Primary Examiner* — William E Dondero
*Assistant Examiner* — Robert T Reese
(74) *Attorney, Agent, or Firm* — James A. Deland

(57) ABSTRACT

A computer-controlled apparatus for setting destination speed stages of a bicycle transmission comprises a shift command unit and a transmission control unit. The shift command unit generates shift commands, and the transmission control unit receives the shift commands and generates transmission command signals for causing the bicycle transmission to move to a destination speed stage. When the shift command unit is operated for a first time interval, the transmission control unit generates a first transmission command signal for causing the bicycle transmission to move through one speed stage to a first destination speed stage. When the shift command unit is operated for a second time interval greater than the first time interval, the transmission control unit generates a second transmission command signal for causing the bicycle transmission to move through a plurality of speed stages to a second destination speed stage.

33 Claims, 3 Drawing Sheets

U.S. PATENT DOCUMENTS

| | | |
|---|---|---|
| 5,865,062 A | 2/1999 | Lahat |
| 5,865,454 A | 2/1999 | Campagnolo |
| 6,015,159 A | 1/2000 | Matsuo |
| 6,047,230 A | 4/2000 | Spencer et al. |
| 6,073,061 A | 6/2000 | Kimura |
| 6,146,297 A | 11/2000 | Kimura |
| 6,367,833 B1 | 4/2002 | Horiuchi |
| 6,459,222 B1 * | 10/2002 | Chen ............................ 318/430 |
| 2002/0094906 A1 | 7/2002 | Jordan |
| 2002/0103052 A2 | 8/2002 | Mercat et al. |
| 2005/0043129 A1 * | 2/2005 | Guderzo ........................ 474/78 |
| 2007/0232425 A1 | 10/2007 | Ichida |
| 2012/0277962 A1 * | 11/2012 | Ingram et al. ................... 701/51 |

* cited by examiner

METHOD AND APPARATUS FOR SHIFTING A BICYCLE TRANSMISSION

CROSS REFERENCE TO RELATED APPLICATIONS

This application is a division of application Ser. No. 11/970,753, filed Jan. 8, 2008, which is a division of application Ser. No. 11/754,343, filed May 28, 2007, now abandoned, which is a division of application Ser. No. 10/001,324, filed Nov. 23, 2001, now abandoned.

BACKGROUND OF THE INVENTION

The present invention is directed to bicycle control devices and, more particularly, to a method and apparatus for shifting a bicycle transmission.

Electrically controlled bicycles usually include a front transmission associated with the front pedal assembly, a rear transmission associated with the rear wheel, a motor for each transmission, a control unit for controlling each motor, and a shift control device such as a lever or switch that provides electrical shift command signals to the control unit. The control unit operates the motors for each transmission based on the electrical signals received from the shift control device. In known electrically controlled bicycles, the transmission increases or decreases only one speed stage or gear ratio for each shift command received from the shift control device.

SUMMARY OF THE INVENTION

The present invention is directed to a method and apparatus for setting a speed stage of a bicycle transmission. In one embodiment, a computer-controlled apparatus for setting destination speed stages of a bicycle transmission comprises a shift command unit and a transmission control unit. The shift command unit generates shift commands, and the transmission control unit receives the shift commands and generates transmission command signals for causing the bicycle transmission to move to a destination speed stage. When the shift command unit is operated for a first time interval, the transmission control unit generates a first transmission command signal for causing the bicycle transmission to move through one speed stage to a first destination speed stage. When the shift command unit is operated for a second time interval greater than the first time interval, the transmission control unit generates a second transmission command signal for causing the bicycle transmission to move through a plurality of speed stages to a second destination speed stage.

In another embodiment, a computer-controlled apparatus for setting destination speed stages of a bicycle transmission comprises a manually-operated switch and a transmission control unit. When the manually-operated switch is operated for a first time interval, the transmission control unit generates a first transmission command signal for causing the bicycle transmission to move through one speed stage to a first destination speed stage. When the manually-operated switch is operated for a second time interval greater than the first time interval, the transmission control unit generates a second transmission command signal for causing the bicycle transmission to move through a plurality of speed stages to a second destination speed stage.

In another embodiment, a method of setting destination speed stages of a bicycle transmission comprises the steps of operating a shift command unit for a first time interval; generating, by a transmission control unit in response to the operation of the shift command unit for the first time interval, a first transmission command signal for causing the bicycle transmission to move through one speed stage to a first destination speed stage; operating the shift command unit for a second time interval greater than the first time interval; and generating, by the transmission control unit in response to the operation of the shift command unit for the second time interval, a second transmission command signal for causing the bicycle transmission to move through a plurality of speed stages to a second destination speed stage.

In another embodiment, a method of setting destination speed stages of a bicycle transmission comprises the steps of operating a manually-operated electrical switch for a first time interval; operating, by a transmission control unit in response to the operation of the manually-operated electrical switch for the first time interval, the bicycle transmission to move through one speed stage to a first destination speed stage; operating the manually-operated electrical switch for a second time interval greater than the first time interval; and operating, by the transmission control unit in response to the operation of the manually-operated electrical switch for the second time interval, the bicycle transmission to move through a plurality of speed stages to a second destination speed stage.

DETAILED DESCRIPTION OF THE EMBODIMENTS

Figure 1:
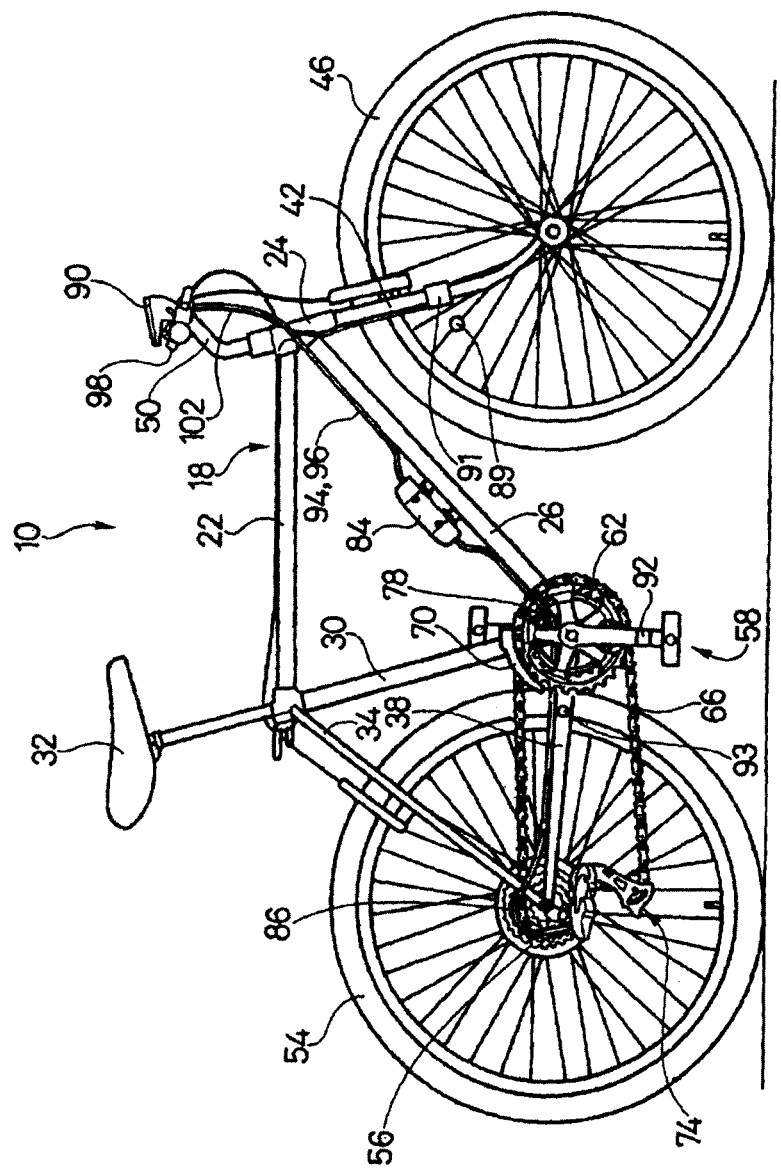
FIG. 1 is a side view of a bicycle that includes a particular embodiment of an apparatus according to the present invention for shifting a bicycle transmission.

FIG. 1 is a side view of a bicycle 10 that incorporates a particular embodiment of an apparatus for shifting a bicycle transmission. Bicycle 10 may be any type of bicycle, and in this embodiment bicycle 10 includes a typical frame 18 comprising a top tube 22, a head tube 24, a down tube 26 extending downwardly from head tube 24, a seat tube 30 supporting a seat 32 and extending downwardly from top tube 22, a bottom bracket (not shown) disposed at the junction of down tube 26 and seat tube 30, a pair of seatstays 34 extending rearwardly and downwardly from top tube 22, and a pair of chainstays 38 extending rearwardly from the bottom bracket. A fork 42 is rotatably supported within head tube 24, and a front wheel 46 is rotatably supported to the lower end of fork 42. Handlebars 50 control the rotational direction of fork 42 and front wheel 46 in a well-known manner. A rear wheel 54 having a plurality of coaxially mounted rear (freewheel)

sprockets 56 is rotatably supported at the junction of seatstays 34 and chainstays 38, and a pedal assembly 58 supporting a plurality of front (chainwheel) sprockets 62 is rotatably supported within the bottom bracket. Typically, two or three front sprockets 62 rotate coaxially and integrally with pedal assembly 58. A chain 66 engages one of the plurality of front sprockets 62 and one of the plurality of rear sprockets 56. A front derailleur 70 moves chain 66 from one front sprocket 62 to another, and a rear derailleur 74 moves chain 66 from one rear sprocket 56 to another. These operations are well known.

Figure 2:
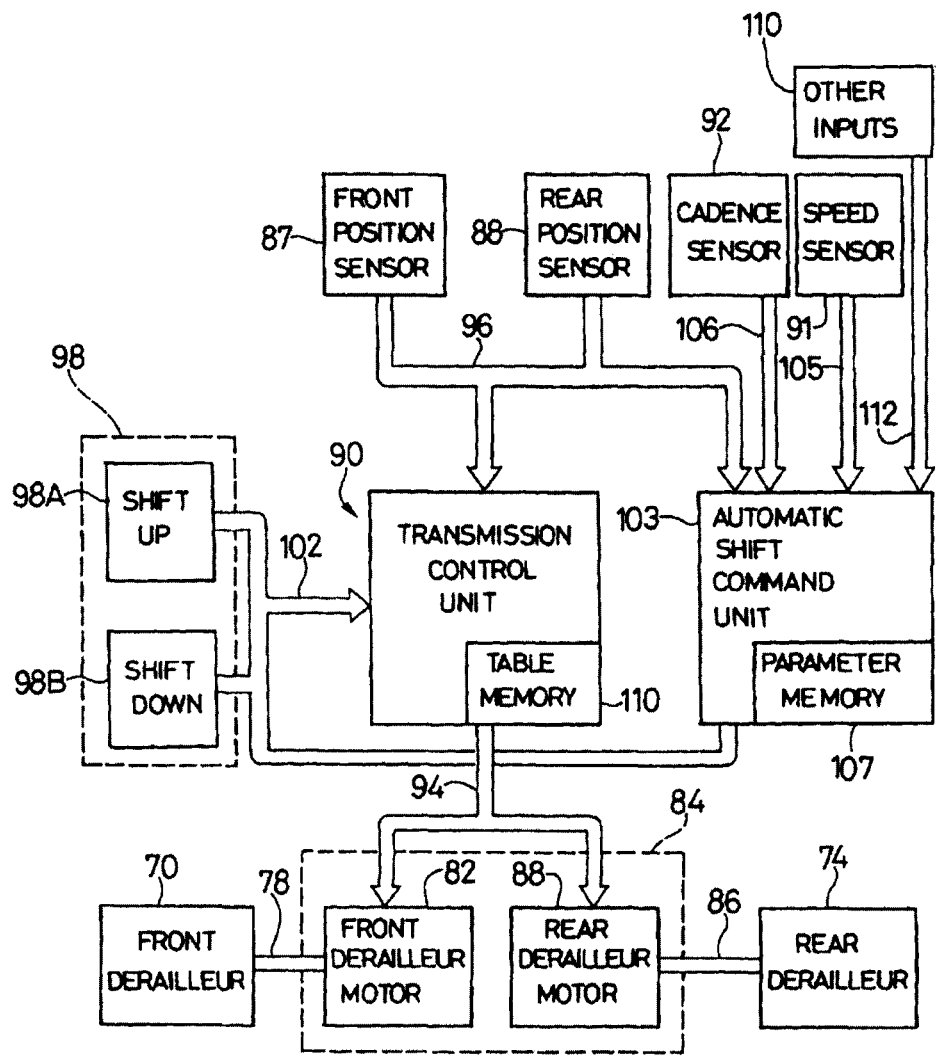
FIG. 2 is a block diagram of a particular embodiment of the apparatus according to the present invention for shifting a bicycle transmission.

In this embodiment, front derailleur 70 is controlled by pulling and releasing a conventional Bowden-type control cable 78 coupled to a front derailleur motor 82 (FIG. 2) disposed in a motor assembly 84, and rear derailleur 74 is controlled by pulling and releasing a Bowden-type control cable 86 coupled to a rear derailleur motor 88 disposed in motor assembly 84. Of course, in some embodiments a single motor may be coupled to separate cable pulling structures through clutches or otherwise to perform the same function, and such also could be deemed distinct motors. A front derailleur position sensor 87 and a rear derailleur position sensor 88 are provided for sensing the operational positions of the front and rear derailleurs 70 and 74, respectively. These position sensors provide signals that, in turn, determine which front sprocket 62 and rear sprocket 56 is currently engaged by chain 66. Such position sensors may comprise, for example, known potentiometers for sensing the positions of the output shafts of front derailleur motor 82 and rear derailleur motor 88, but there are many other known structures that can perform these functions. A speed sensor 91 is mounted to fork 42 for receiving signals from a magnet 89 mounted to front wheel 46 for sensing the speed of the bicycle in a well-known manner, and a cadence sensor 92 is mounted to pedal assembly 58 for receiving signals from a magnet 93 mounted to one of the chainstays 38 for sensing the pedal cadence in a well known manner.

A transmission control unit 90 is operatively coupled to motor assembly 84 through a transmission command communication path 94 and to position sensors 87 and 88 through a transmission position communication path 96 for generating transmission command (TC) signals for controlling the operation of motor assembly 84 in accordance with the information from position sensors 87 and 88. A manually operated shift command unit 98, comprising a shift-up switch 98A and a shift-down switch 98B, is operatively coupled to transmission control unit 90 through a shift command communication path 102 for communicating electrical shift commands (described in more detail below) to transmission control unit 90. Furthermore, an automatic shift command unit 103 is operatively coupled to transmission control unit 90 through shift command communication path 102, to position sensors 87 and 88 through transmission position communication path 96, to speed sensor 91 through a speed communication path 105, and to cadence sensor 92 through a cadence communication path 106 for communicating electrical shift commands to transmission control unit 90 in accordance with signals received from position sensors 87 and 88, speed sensor 91 and/or cadence sensor 92. Such shift commands may comprise the shift commands described below for shift command unit 98, or they may comprise digital messages. Automatic shift command unit 103 includes a parameter memory 107 for storing wheel circumference, cadence tables, speed tables and/or acceleration tables for generating shift commands based on cadence, speed and/or acceleration in accordance with known programming techniques. Parameter memory 107 may be a hardware table memory, a software table memory, or some other structure that provides the same information. Other inputs 110 may be operatively coupled to automatic shift command unit 103 through a communication path 112 for communicating other information such as from a heart rate sensor, a slope sensor, a pedal or other torque sensor, etc. Parameter memory 107 and the programming of automatic shift command unit 103 may be configured accordingly to generate shift commands in accordance with these other inputs in any combination. Of course, in some embodiments only manually operated shift command unit 98 may be provided, and in other embodiments only automatic shift command unit 103 may be provided. In this embodiment, communication paths 94, 96, 102, 105 and 106 have the form of electrical wires, but in other embodiments such communication paths may comprise fiber optic devices, wireless communication paths, or some other mechanism.

According to the present invention, when the transmission control unit 90 receives at least one shift command requesting a shift from an origin speed stage through N destination speed stages to a final destination speed stage, wherein N is an integer greater than one, transmission control unit 90 generates TC signals (digital or analog) for causing front derailleur 70 and rear derailleur 74 in combination to move a total of M times to reach the final destination speed stage, wherein M is an integer less than N. To accomplish this, transmission control unit 90 comprises a table memory 110 for storing a table containing the information for controlling the operation of front derailleur 70 and rear derailleur 74. Table memory 110 may be a hardware table memory, a software table memory, or some other structure that provides the same information. The content of table memory 110 depends upon the configuration of the bicycle. Three examples will be provided below, and other configurations will be readily apparent to one of ordinary skill in the art.

Figure 3A:
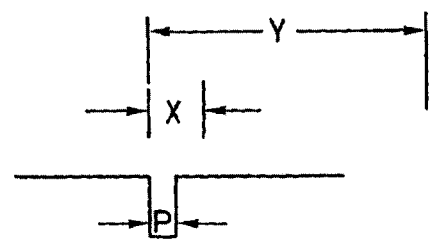
FIG. 3A is a timing diagram illustrating a possible electrical shift command signal received by the control unit shown in FIG. 2.
Figure 3B:
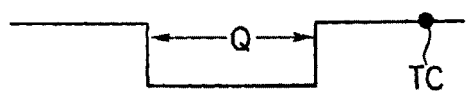
FIG. 3B is a timing diagram illustrating another possible electrical shift command signal received by the control unit shown in FIG. 2.
Figure 3C:
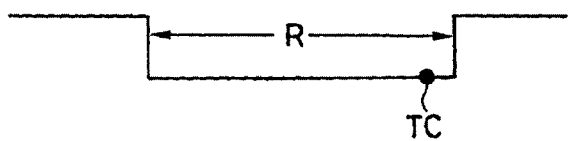
FIG. 3C is a timing diagram illustrating another possible electrical shift command signal received by the control unit shown in FIG. 2.

FIGS. 3A-3E are timing diagrams indicating various embodiments of shift commands generated by shift command unit 98 and the timing of TC signals generated by transmission control unit 90. In each diagram, the shift command signals are low active. FIG. 3A illustrates a situation wherein a shift command signal is generated by shift command unit 98 for a time interval P that is less than a predetermined time interval X. In this embodiment, such a shift command signal is assumed to be a spurious signal, and no operation is performed. Of course, in other embodiments such a shift command signal could perform some kind of function. FIG. 3B illustrates a situation wherein a shift command signal is generated by shift command unit 98 for a time interval Q that is greater than time interval X. In this embodiment, such a shift command signal requests a shift by one speed stage, and the TC signal is generated accordingly. FIG. 3C illustrates a situation wherein a shift command signal is generated by shift command unit 98 for a time interval R that is greater than time interval X and also greater than a time interval Y, wherein, for the purposes of measurement, time interval Y begins at the same instant as time interval X but is greater than time interval X. In this embodiment, such a shift command signal requests a shift by two speed stages, and the TC signal is generated accordingly.

Figure 3D:
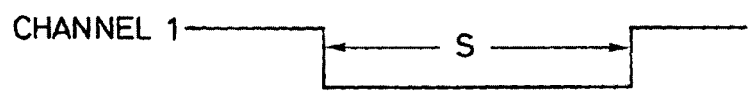
FIG. 3D is a timing diagram illustrating a possible composite electrical shift command signal received by the control unit shown in FIG. 2.
Figure 3E:
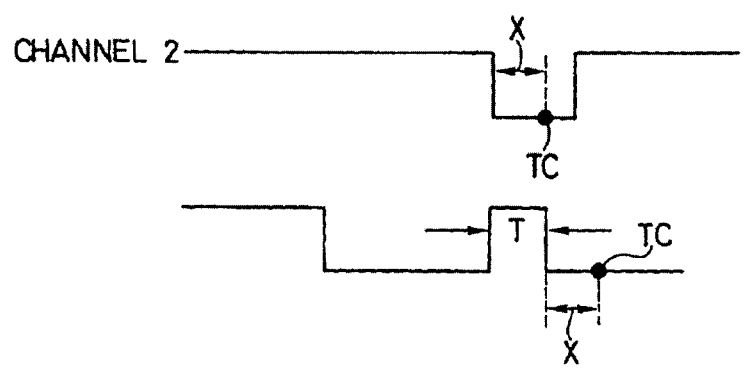
FIG. 3E is a timing diagram illustrating another possible composite electrical shift command signal received by the control unit shown in FIG. 2.

FIG. 3D illustrates a situation wherein a composite shift command signal appearing on two channels is generated by shift command unit 98. In this example, the shift command signal appearing on channel 1 is generated for a time interval S that is greater than time interval X. A shift command signal is generated on channel 2 prior to the expiration of time interval Y. In this embodiment, such a composite shift command signal requests a shift by two speed stages, and the TC signal is generated accordingly. Such a composite signal could be generated by two separately operated switches, but in most cases it would be more convenient to generate such signals by a plunger with an electrical contact which successively and cumulatively contacts two other electrical contacts. Such a switch also could be used to generate the signal shown in FIGS. 3A-3C by depressing the plunger only enough to activate one of the two other electrical contacts. Of course, many ways of generating such signals could be devised. FIG. 3E illustrates a situation wherein sequential shift command signals are generated by shift command unit 98. In this example, two sequential shift command signals are generated within a time interval T of each other. Such an action is similar to double-clicking a computer mouse. In this embodiment, such sequential shift command signals request a shift by two speed stages, and the TC signal is generated accordingly. Each shift-up switch 98A and shift-down switch 98B may use any of the techniques illustrated in FIGS. 3A-3E to suit the application.

Automatic shift command unit 103 may generate the signals illustrated in FIGS. 3B-3E for the same purposes described for them, or it may generate digital messages. Digital messages would be particularly useful to request a shift through more than two speed stages, although manual shift command unit 98 could be configured to provide signals for that purpose as well. The signals generated by automatic shift command unit 103 representing shifts through multiple speed stages could be generated based on cadence, speed, acceleration, or some other criteria.

Table 1 illustrates a bicycle with two front sprockets 62 and eight rear sprockets 56, and Table 2 illustrates the shift commands and TC signals for operating front derailleur 70 and rear derailleur 74 for this configuration. Transmission control unit 90 is programmed, whether through hardwired logic, software or otherwise to generate the appropriate TC signals on communication path 94 in response to the indicated shift command.

TABLE 1

| | | Rear Sprocket | | | | | | | |
|---|---|---|---|---|---|---|---|---|---|
| | Teeth | 11 | 13 | 15 | 17 | 21 | 25 | 29 | 33 |
| Front Sprocket | 46 | 4.18 | 3.54 | 3.07 | 2.71 | 2.19 | 1.84 | 1.59 | 1.39 |
| | 34 | 3.09 | 2.62 | 2.27 | 2.00 | 1.62 | 1.36 | 1.17 | 1.03 |

TABLE 2

| Present Gear | | Signal Recognized By Control Unit | | | |
|---|---|---|---|---|---|
| Position | | Two Steps | One Step | Two Steps | One Step |
| Front | Rear | Up | Up | Down | Down |
| 46 | 11 | Alarm | Alarm | front − 1 | rear − 1 |
| 46 | 13 | rear + 1 | rear + 1 | front − 1 | rear − 1 |
| 46 | 15 | rear + 2 | rear + 1 | front − 1 | rear − 1 |
| 46 | 17 | rear + 2 | rear + 1 | front − 1 | rear − 1 |
| 46 | 21 | rear + 2 | rear + 1 | front − 1 | rear − 1 |
| 46 | 25 | rear + 2 | rear + 1 | front − 1 | rear − 1 |
| 46 | 29 | rear + 2 | rear + 1 | front − 1 | rear − 1 |
| 46 | 33 | rear + 2 | rear + 1 | front − 1 | front − 1 rear + 1 |
| 34 | 11 | front + 1 | front + 1, rear − 1 | rear − 2 | rear − 1 |
| 34 | 13 | front + 1 | rear + 1 | rear − 2 | rear − 1 |
| 34 | 15 | front + 1 | rear + 1 | rear − 2 | rear − 1 |
| 34 | 17 | front + 1 | rear + 1 | rear − 2 | rear − 1 |
| 34 | 21 | front + 1 | rear + 1 | rear − 2 | rear − 1 |
| 34 | 25 | front + 1 | rear + 1 | rear − 2 | rear − 1 |
| 34 | 29 | front + 1 | rear + 1 | rear − 1 | rear − 1 |
| 34 | 33 | front + 1 | rear + 1 | Alarm | Alarm |

Table 3 illustrates a bicycle with three front sprockets 62 and eight rear sprockets 56, and Table 4 illustrates the shift commands and TC signals for operating front derailleur 70 and rear derailleur 74 for this configuration.

TABLE 3

| | | Rear Sprocket | | | | | | | |
|---|---|---|---|---|---|---|---|---|---|
| | Teeth | 11 | 13 | 15 | 17 | 21 | 25 | 29 | 33 |
| Front Sprocket | 46 | 4.18 | 3.54 | 3.07 | 2.71 | 2.19 | 1.84 | 1.59 | 1.39 |
| | 34 | 3.09 | 2.62 | 2.27 | 2.00 | 1.62 | 1.36 | 1.17 | 1.03 |
| | 24 | 2.18 | 1.85 | 1.60 | 1.41 | 1.14 | 0.96 | 0.83 | 0.73 |

TABLE 4

| Present Gear | | Signal Recognized By Computer | | | |
|---|---|---|---|---|---|
| Position | | Two Steps | One Step | Two Steps | One Step |
| Front | Rear | Up | Up | Down | Down |
| 46 | 11 | Alarm | Alarm | front − 1 | rear − 1 |
| 46 | 13 | rear + 1 | rear + 1 | front − 1 | rear − 1 |
| 46 | 15 | rear + 2 | rear + 1 | front − 1 | rear − 1 |
| 46 | 17 | rear + 2 | rear + 1 | front − 1 | rear − 1 |
| 46 | 21 | rear + 2 | rear + 1 | front − 1 | rear − 1 |
| 46 | 25 | rear + 2 | rear + 1 | front − 1 | rear − 1 |
| 46 | 29 | rear + 2 | rear + 1 | front − 1 | rear − 1 |
| 46 | 33 | rear + 2 | rear + 1 | front − 1 | front − 1 rear + 1 |
| 34 | 11 | front + 1 | front + 1, rear − 1 | front − 1 | rear − 1 |
| 34 | 13 | front + 1 | rear + 1 | front − 1 | rear − 1 |
| 34 | 15 | front + 1 | rear + 1 | front − 1 | rear − 1 |
| 34 | 17 | front + 1 | rear + 1 | front − 1 | rear − 1 |
| 34 | 21 | front + 1 | rear + 1 | front − 1 | rear − 1 |
| 34 | 25 | front + 1 | rear + 1 | front − 1 | rear − 1 |
| 34 | 29 | front + 1 | rear + 1 | front − 1 | rear − 1 |
| 34 | 33 | front + 1 | rear + 1 | front − 1 | front − 1, rear + 1 |
| 24 | 11 | front + 1 | front + 1, rear − 1 | rear − 2 | rear − 1 |
| 24 | 13 | front + 1 | rear + 1 | rear − 2 | rear − 1 |
| 24 | 15 | front + 1 | rear + 1 | rear − 2 | rear − 1 |
| 24 | 17 | front + 1 | rear + 1 | rear − 2 | rear − 1 |
| 24 | 21 | front + 1 | rear + 1 | rear − 2 | rear − 1 |
| 24 | 25 | front + 1 | rear + 1 | rear − 2 | rear − 1 |
| 24 | 29 | front + 1 | rear + 1 | rear − 1 | rear − 1 |
| 24 | 33 | front + 1 | rear + 1 | Alarm | Alarm |

Table 5 illustrates the shift commands and TC signals for operating front derailleur 70 and rear derailleur 74 for the same configuration when implementing the concept of a prohibited range of sprocket combinations. Such prohibited sprocket combinations typically comprise the combination of the large front sprocket with the large rear sprockets, which results in excessive chain tension, and the small front sprocket with the small rear sprockets, which results in excessive chain looseness.

TABLE 5

| Present Gear | | Signal Recognized By Computer | | | |
|---|---|---|---|---|---|
| Position | | Two Steps | One Step | Two Steps | One Step |
| Front | Rear | Up | Up | Down | Down |
| 46 | 11 | Alarm | Alarm | front − 1 | rear − 1 |
| 46 | 13 | rear + 1 | rear + 1 | front − 1 | rear − 1 |
| 46 | 15 | rear + 2 | rear + 1 | front − 1 | rear − 1 |
| 46 | 17 | rear + 2 | rear + 1 | front − 1 | rear − 1 |
| 46 | 21 | rear + 2 | rear + 1 | front − 1 | front − 1, rear + 1 |
| 46 | 25 | Prohibited | Prohibited | Prohibited | Prohibited |
| 46 | 29 | Prohibited | Prohibited | Prohibited | Prohibited |
| 46 | 33 | Prohibited | Prohibited | Prohibited | Prohibited |
| 34 | 11 | front + 1 | front + 1, rear − 1 | rear − 2 | rear − 1 |

TABLE 5-continued

| Present Gear | | Signal Recognized By Computer | | | |
|---|---|---|---|---|---|
| Position | | Two Steps | One Step | Two Steps | One Step |
| Front | Rear | Up | Up | Down | Down |
| 34 | 13 | front + 1 | rear + 1 | rear − 2 | rear − 1 |
| 34 | 15 | front + 1 | rear + 1 | rear − 2 | rear − 1 |
| 34 | 17 | front + 1 | rear + 1 | front − 1 | rear − 1 |
| 34 | 21 | front + 1 | rear + 1 | front − 1 | rear − 1 |
| 34 | 25 | rear + 2 | rear + 1 | front − 1 | rear − 1 |
| 34 | 29 | rear + 2 | rear + 1 | front − 1 | rear − 1 |
| 34 | 33 | rear + 2 | rear + 1 | front − 1 | front − 1, rear + 1 |
| 24 | 11 | Prohibited | Prohibited | Prohibited | Prohibited |
| 24 | 13 | Prohibited | Prohibited | Prohibited | Prohibited |
| 24 | 15 | Prohibited | Prohibited | Prohibited | Prohibited |
| 24 | 17 | front + 1 | front + 1, rear − 1 | rear − 2 | rear − 1 |
| 24 | 21 | front + 1 | rear + 1 | rear − 2 | rear − 1 |
| 24 | 25 | front + 1 | rear + 1 | rear − 2 | rear − 1 |
| 24 | 29 | front + 1 | rear + 1 | rear − 1 | rear − 1 |
| 24 | 33 | front + 1 | rear + 1 | Alarm | Alarm |

In all examples, it should be noticed that some shift commands that request a change through two speed stages require only one movement of one derailleur. For example, assume in the first configuration that chain 66 is disposed on the 34-tooth front sprocket 62 and the 33-tooth rear sprocket 56, thus producing a speed stage having a gear ratio of 1.03. If shift command unit 98 generates a signal indicating a two-step-up shift command (two sequential gear ratios), then transmission control unit 90 may generate a TC signal to move front derailleur 70 a single step so that chain 66 engages the 46-tooth front sprocket 62, thus producing the speed stage having a gear ratio of 1.39. Prior art electrically controlled bicycles would move rear derailleur 74 from the 33-tooth rear sprocket 56 to the 29-tooth rear sprocket 56, and then to the 25-tooth rear sprocket 56, thus producing the speed stage having a gear ratio of 1.36. Such a technique requires a total of two movements, rather than the one movement taught herein.

The method and apparatus according to the present invention takes advantage of the fact that many front/rear sprocket combinations produce substantially the same gear ratio. The TC signals are generated based on which combination of front and rear sprockets require the least number of movements of the front derailleur 70 and/or rear derailleur 74 to achieve the desired gear ratio. In general, particularly good results can be achieved by selecting the front and rear sprockets such that, for a given combination of front and rear sprockets, the change in gear ratio that results when switching from one front sprocket to another front sprocket is substantially an integral number of the change in gear ratio when switching from one rear sprocket to another rear sprocket. In the embodiment disclosed above, the change in gear ratio that results when switching from one front sprocket to another front sprocket is substantially twice the change in gear ratio when switching from one rear sprocket to another rear sprocket. If a shift command signal is received that cannot be accommodated, such as a shift-up command to when the chain 66 currently engages the largest front sprocket 62 and the smallest rear sprocket 56, then table memory 110 can instruct the system to sound an audible alarm indicating an illegal request. In such a situation front derailleur 70 and rear derailleur 74 remain stationary.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A computer-controlled apparatus for setting destination speed stages of a bicycle transmission, wherein the apparatus comprises:
a shift command unit structured to generate a shift command; and
a transmission control unit that receives the shift command and generates a transmission command signal for causing the bicycle transmission to move to a destination speed stage;
wherein, when the shift command unit is operated for the duration of a first time interval, the transmission control unit generates a first transmission command signal for causing the bicycle transmission to move through one speed stage to a first destination speed stage; and
wherein, when the shift command unit is operated for the duration of a second time interval greater than the duration of the first time interval, the transmission control unit generates a second transmission command signal for causing the bicycle transmission to move through a plurality of speed stages to a second destination speed stage.

2. The apparatus according to claim 1 wherein the duration of the first time interval is greater than a predetermined value.

3. The apparatus according to claim 1 wherein the second transmission command signal causes the bicycle transmission to move through two speed stages to the second destination speed stage.

4. The apparatus according to claim 1 wherein the shift command unit comprises a manually-operated switch that generates the shift command.

5. The apparatus according to claim 4 wherein the shift command unit is structured to be mounted to a bicycle handlebar so that the rider manually operates the switch during riding.

6. The apparatus according to claim 5 wherein the switch comprises one of an upshift switch or a downshift switch.

7. The apparatus according to claim 4 wherein the switch includes a manually-operated member that is pressed to activate the switch to generate the shift command.

8. The apparatus according to claim 7 wherein the transmission control unit generates the first transmission command signal when the manually-operated member is pressed for the duration of the first time interval to activate the switch, and wherein the transmission control unit generates the second transmission command signal when the manually-operated member is pressed for the duration of the second time interval to activate the switch.

9. The apparatus according to claim 7 wherein the shift command unit generates a first shift command signal when the manually-operated member is pressed for the duration of the first time interval to activate the switch, wherein the shift command unit generates a second shift command signal when the manually-operated member is pressed for the duration of the second time interval to activate the switch, wherein the transmission control unit generates the first transmission command signal in response to receiving the first shift command signal, and wherein the transmission control unit generates the second transmission command signal in response to receiving the second shift command signal.

10. The apparatus according to claim 7 wherein the transmission control unit generates the first transmission command signal when the switch is activated for the duration of the first time interval, and wherein the transmission control unit generates the second transmission command signal when the switch is activated for the duration of the second time interval.

11. The apparatus according to claim 10 wherein the transmission control unit generates the first transmission command signal after the switch is no longer activated.

12. The apparatus according to claim 10 wherein the transmission control unit generates the second transmission command signal while the switch is activated.

13. The apparatus according to claim 7 wherein the shift command unit generates a first shift command signal when the switch is activated for the duration of the first time interval, and wherein the shift command unit generates a second shift command signal when the switch is activated for the duration of the second time interval.

14. The apparatus according to claim 13 wherein the transmission control unit generates the first transmission command signal after the first shift command signal ceases.

15. The apparatus according to claim 13 wherein the transmission control unit generates the second transmission command signal while the second shift command signal is being generated.

16. The apparatus according to claim 13 wherein the first shift command signal and the second shift command signal each comprises an active high signal or an active low signal.

17. The apparatus according to claim 16 wherein a value of the active high signal or the active low signal is substantially constant for the entire duration of the first time interval or second time interval that the switch is activated.

18. A computer-controlled apparatus for setting destination speed stages of a bicycle transmission, wherein the apparatus comprises:
a manually-operated switch; and
a transmission control unit coupled to the manually-operated switch for causing the bicycle transmission to move to a destination speed stage;
wherein, when the manually-operated switch is operated for the duration of a first time interval, the transmission control unit controls the bicycle transmission to move through one speed stage to a first destination speed stage; and
wherein, when the manually-operated switch is operated for the duration of a second time interval greater than the first time interval, the transmission control unit controls the bicycle transmission to move through a plurality of speed stages to a second destination speed stage.

19. A method of setting destination speed stages of a bicycle transmission, wherein the method comprises the steps of:
operating a shift command unit for the duration of a first time interval;
generating, by a transmission control unit in response to the operation of the shift command unit for the duration of the first time interval, a first transmission command signal for causing the bicycle transmission to move through one speed stage to a first destination speed stage; and
operating the shift command unit for the duration of a second time interval greater than the first time interval;
generating, by the transmission control unit in response to the operation of the shift command unit for the duration of the second time interval, a second transmission command signal for causing the bicycle transmission to move through a plurality of speed stages to a second destination speed stage.

20. The method according to claim 19 wherein the duration of the first time interval is greater than a predetermined value.

21. The method according to claim 19 wherein the second transmission command signal causes the bicycle transmission to move through two speed stages to the second destination speed stage.

22. The method according to claim 19 wherein the step of operating the shift command unit comprises the step of pressing a manually-operated member to activate a switch to generate a shift command.

23. The method according to claim 22 wherein the step of generating the first transmission command signal comprises the step of generating the first transmission command signal when the manually-operated member is pressed for the duration of the first time interval to activate the switch, and wherein the step of generating the second transmission command signal comprises the step of generating the second transmission command signal when the manually-operated member is pressed for the duration of the second time interval to activate the switch.

24. The method according to claim 22 further comprising the steps of:
generating a first shift command signal when the manually-operated member is pressed for the duration of the first time interval; and
generating a second shift command signal when the manually-operated member is pressed for the duration of the second time interval;
wherein the step of generating the first transmission command signal comprises the step of generating the first transmission command signal in response to receiving the first shift command signal; and
wherein the step of generating the second transmission command signal comprises the step of generating the second transmission command signal in response to receiving the second shift command signal.

25. The apparatus according to claim 22 wherein the step of generating the first transmission command signal comprises the step of generating the first transmission command signal when the switch is activated for the duration of the first time interval, and wherein the step of generating the second transmission command signal comprises the step of generating the second transmission command signal when the switch is activated for the duration of the second time interval.

26. The method according to claim 25 wherein the step of generating the first transmission command signal comprises the step of generating the first transmission command signal after the switch is no longer activated.

27. The method according to claim 25 wherein the step of generating the second transmission command signal comprises the step of generating the second transmission command signal while the switch is activated.

28. The method according to claim 22 wherein the step of generating the first shift command signal comprises the step of generating the first shift command signal when the switch is activated for the duration of the first time interval, and wherein the step of generating the second shift command signal comprises the step of generating the second shift command signal when the switch is activated for the duration of the second time interval.

29. The method according to claim 28 wherein the step of generating the first transmission command signal comprises the step of generating the first transmission command signal after the first shift command signal ceases.

30. The method according to claim 28 wherein the step of generating the second transmission command signal comprises the step of generating the second transmission command signal while the second shift command signal is being generated.

31. The method according to claim 28 wherein the first shift command signal and the second shift command signal each comprises an active high signal or an active low signal.

32. The method according to claim 31 wherein a value of the active high signal or the active low signal is substantially constant for the entire duration of the first time interval or second time interval that the switch is activated.

33. A method of setting destination speed stages of a bicycle transmission, wherein the method comprises the steps of:
- operating a manually-operated electrical switch for the duration of a first time interval operating, by a transmission control unit in response to the operation of the manually-operated electrical switch for the duration of the first time interval, the bicycle transmission to move through one speed stage to a first destination speed stage;
- operating the manually-operated electrical switch for the duration of a second time interval greater than the duration of the first time interval; and
- operating, by the transmission control unit in response to the operation of the manually-operated electrical switch for the duration of the second time interval, the bicycle transmission to move through a plurality of speed stages to a second destination speed stage.

* * * * *